United States Patent
Ly

(10) Patent No.: US 12,167,458 B2
(45) Date of Patent: Dec. 10, 2024

(54) RANDOM ACCESS PUSCH ENHANCEMENTS

(71) Applicant: QUALCOMM Incorporated, San Diego, CA (US)

(72) Inventor: Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 17/020,778

(22) Filed: Sep. 14, 2020

(65) Prior Publication Data

US 2021/0084689 A1 Mar. 18, 2021

Related U.S. Application Data

(60) Provisional application No. 62/901,545, filed on Sep. 17, 2019.

(51) Int. Cl.
*H04W 74/0833* (2024.01)
*H04W 72/0446* (2023.01)
*H04W 72/23* (2023.01)

(52) U.S. Cl.
CPC ... *H04W 74/0833* (2013.01); *H04W 72/0446* (2013.01); *H04W 72/23* (2023.01)

(58) Field of Classification Search
CPC .......... H04W 74/0833; H04W 72/042; H04W 72/0446
See application file for complete search history.

(56) References Cited

U.S. PATENT DOCUMENTS

2012/0269143 A1* 10/2012 Bertrand ........... H04W 72/1231
370/329
2018/0146438 A1* 5/2018 Yi ........................ H04W 52/24
(Continued)

FOREIGN PATENT DOCUMENTS

WO 2019145129 A1 8/2019

OTHER PUBLICATIONS

Citation part 1 of 2—Ericsson: "Quality Report in Msg3 and Connected Mode in LTE-MTC", 3GPP TSG-RAN WG1 Meeting #98, 3GPP Draft; R1-1908022 Quality Report in MSG3 and Connected Mode in LTE-MTC, 3rd Generation Partnership Project (3GPP), Mobile Competence Centre ; 650, Route Des Lucioles; F-06921 Sophia-Antipolis CE, vol. RAN WG1, No. Prague, Czech Republic; Aug. 26, 2019-Aug. 31, 2019, Aug. 17, 2019.
(Continued)

*Primary Examiner* — Siren Wei
(74) *Attorney, Agent, or Firm* — Harrity & Harrity LLP/Qualcomm Incorporated

(57) ABSTRACT

Methods, systems, and devices for wireless communication are described. A wireless device may identify an aggregation parameter for a Physical Uplink Shared Channel (PUSCH) transmission in a random access procedure, determine a repetition level for the PUSCH transmission based on the aggregation parameter, and transmit, as part of the random access procedure, the PUSCH transmission according to the repetition level. A base station may determine a repetition level for a Physical Uplink Shared Channel (PUSCH) transmission in a random access procedure, transmit, to a user equipment (UE), an aggregation parameter indicating the repetition level, and receive, as part of the random access procedure, the PUSCH transmission according to the repetition level.

30 Claims, 8 Drawing Sheets

(56) References Cited

U.S. PATENT DOCUMENTS

| | | | |
|---|---|---|---|
| 2019/0045554 A1 | 2/2019 | Ye et al. | |
| 2019/0215872 A1 | 7/2019 | Park et al. | |
| 2019/0306922 A1* | 10/2019 | Xiong | H04W 72/21 |
| 2019/0342921 A1* | 11/2019 | Loehr | H04W 72/23 |
| 2020/0187015 A1* | 6/2020 | Li | H04W 16/18 |
| 2021/0014005 A1* | 1/2021 | Ying | H04L 1/1887 |
| 2021/0051669 A1* | 2/2021 | Lin | H04W 72/53 |
| 2021/0051707 A1* | 2/2021 | Rastegardoost | H04B 17/318 |
| 2021/0250970 A1* | 8/2021 | Ekpenyong | H04W 72/1268 |
| 2021/0321445 A1* | 10/2021 | Yang | H04L 1/1896 |

OTHER PUBLICATIONS

Citation part 2 of 2—(Aug. 17, 2019), pp. 1-7, XP051764645, Retrieved from the Internet: URL: http://www.3gpp.org/ftp/tsg_ran/WG1_RL1/TSGR1_98/Docs/R1-1908022.zip [retrieved on Aug. 17, 2019], Section "2.1 Background", Tables 1-4, Figures 1, 2. section "2.2.2 Trigger for reporting" section "2.2.3 Whether to report aggregation level in CE mode A"; section "2.2.4 Number of bits used for the report"; Observations 1-4; Proposals 3, 4.
International Search Report and Written Opinion—PCT/US2020/050917—ISA/EPO—Dec. 1, 2020.

\* cited by examiner

RANDOM ACCESS PUSCH ENHANCEMENTS

CLAIM OF PRIORITY UNDER 35 U.S.C. § 119

The present application for patent claims priority to Provisional Application No. 62/901,545 entitled "RANDOM ACCESS PUSCH ENHANCEMENTS" filed Sep. 17, 2019 and assigned to the assignee hereof and hereby expressly incorporated by reference herein.

BACKGROUND

The following relates to wireless communication and random access uplink channel enhancements.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support random access uplink enhancements. A method of wireless communication is described. The method may include identifying an aggregation parameter for a Physical Uplink Shared Channel (PUSCH) transmission in a random access procedure, determining a repetition level for the PUSCH transmission based on the aggregation parameter, and transmitting, as part of the random access procedure, the PUSCH transmission according to the repetition level.

An apparatus for wireless communication is described. The apparatus may include a processor, a memory coupled to the processor, and instructions stored in the memory. The instructions may be executable by the processor to cause the apparatus to identify an aggregation parameter for a Physical Uplink Shared Channel (PUSCH) transmission in a random access procedure, determine a repetition level for the PUSCH transmission based on the aggregation parameter, and transmit, as part of the random access procedure, the PUSCH transmission according to the repetition level.

A non-transitory computer readable medium storing code for wireless communication is described. The code may include instructions executable by a processor to identify an aggregation parameter for a Physical Uplink Shared Channel (PUSCH) transmission in a random access procedure, determine a repetition level for the PUSCH transmission based on the aggregation parameter, and transmit, as part of the random access procedure, the PUSCH transmission according to the repetition level.

Another apparatus for wireless communication is described. The apparatus may include means for identifying an aggregation parameter for a Physical Uplink Shared Channel (PUSCH) transmission in a random access procedure, means for determining a repetition level for the PUSCH transmission based on the aggregation parameter, and means for transmitting, as part of the random access procedure, the PUSCH transmission according to the repetition level.

In some examples of the method, apparatuses, or non-transitory computer-readable medium described herein, the transmitting comprises transmitting the PUSCH transmission with a same symbol allocation in each slot where the PUSCH is transmitted according to the repetition level. In some examples, the PUSCH transmission includes initial transmission or retransmission of the PUSCH transmission according to the repetition level, or both. In some examples, the aggregation parameter is received in cell-specific PUSCH parameters in radio resource control (RRC) signaling. In some examples, the aggregation parameter is received in a random access response. In some examples, the aggregation parameter is received as part of a random access configuration in a system information block. In some examples, the aggregation parameter is received in downlink control information (DCI) scrambled by a temporary cell random network temporary identifier (TC-RNTI). In some examples, the aggregation parameter is identified from a technical specification.

In some examples, the aggregation parameter comprises a value indicating repetition level for all UEs in a cell. In some examples, the aggregation parameter comprises either a first value indicating repetition level for a first type of UE or a second value indicating repetition level for a second type of UE. In some examples, the aggregation parameter comprises a value indicating repetition level for a particular type of UE. In some examples, the aggregation parameter comprises a plurality of values indicating different repetition levels of the PUSCH transmission.

Some examples of the method, apparatuses, or non-transitory computer-readable medium described herein may further include processes, features, means, or instructions for selecting one of the plurality of values based on a channel quality measurement. Some examples of the method, apparatuses, or non-transitory computer-readable medium described herein may further include processes, features, means, or instructions for determining that at least one particular repetition of the PUSCH transmission overlaps in a same slot with a preconfigured resource or a scheduled downlink measurement. Some examples of the method, apparatuses, or non-transitory computer-readable medium described herein may further include processes, features, means, or instructions for not transmitting the particular repetition of the PUSCH transmission. Some examples of the method, apparatuses, or non-transitory computer-readable medium described herein may further include processes, features, means, or instructions for transmitting the particular repetition of the PUSCH transmission, and dropping communication on the preconfigured resource or dropping the scheduled downlink measurement. Some examples of the method, apparatuses, or non-transitory computer-readable medium described herein may further include processes, features, means, or instructions for determining whether to transmit or drop the particular repetition of the PUSCH transmission based on a radio resource control (RRC) state of the UE.

A method of wireless communication is described. The method may include determining a repetition level for a Physical Uplink Shared Channel (PUSCH) transmission in a random access procedure, transmitting, to a user equipment (UE), an aggregation parameter indicating the repetition level, and receiving, as part of the random access procedure, the PUSCH transmission according to the repetition level.

An apparatus for wireless communication is described. The apparatus may include a processor, a memory in electronic communication with the processor, and instructions stored in the memory. The instructions may be executable by the processor to cause the apparatus to determine a repetition level for a Physical Uplink Shared Channel (PUSCH) transmission in a random access procedure, transmit, to a user equipment (UE), an aggregation parameter indicating the repetition level, and receive, as part of the random access procedure, the PUSCH transmission according to the repetition level.

A non-transitory computer readable medium storing code for wireless communication is described. The code may include instructions executable by a processor to determine a repetition level for a Physical Uplink Shared Channel (PUSCH) transmission in a random access procedure, transmit, to a user equipment (UE), an aggregation parameter indicating the repetition level, and receive, as part of the random access procedure, the PUSCH transmission according to the repetition level.

Another apparatus for wireless communication is described. The apparatus may include means for determining a repetition level for a Physical Uplink Shared Channel (PUSCH) transmission in a random access procedure, means for transmitting, to a user equipment (UE), an aggregation parameter indicating the repetition level, and means for receiving, as part of the random access procedure, the PUSCH transmission according to the repetition level.

In some examples of the method, apparatuses, or non-transitory computer-readable medium described herein, the PUSCH transmission is received with a same symbol allocation in each slot where the PUSCH is received according to the repetition level. In some examples, the PUSCH transmission includes initial transmission or retransmission of the PUSCH transmission according to the repetition level, or both. In some examples, the aggregation parameter is transmitted in cell-specific PUSCH parameters in radio resource control (RRC) signaling. In some examples, the aggregation parameter is transmitted in a random access response. In some examples, the aggregation parameter is transmitted as part of a random access configuration in a system information block. In some examples, the aggregation parameter is transmitted in downlink control information (DCI) scrambled by a temporary cell random network temporary identifier (TC-RNTI). In some examples, the aggregation parameter comprises a value indicating repetition level for all UEs in a cell. In some examples, the aggregation parameter comprises either a first value indicating repetition level for a first type of UE or a second value indicating repetition level of a second type of UE. In some examples, the aggregation parameter comprises a value indicating repetition level for a particular type of UE. In some examples, the aggregation parameter comprises a plurality of values indicating different repetition levels of the PUSCH transmission.

Some examples of the method, apparatuses, or non-transitory computer-readable medium described herein may further include processes, features, means, or instructions for not receiving a particular repetition of the PUSCH transmission when the particular repetition of the PUSCH transmission overlaps in a same slot with a preconfigured resource or a scheduled downlink measurement. Some examples of the method, apparatuses, or non-transitory computer-readable medium described herein may further include processes, features, means, or instructions for receiving a particular repetition of the PUSCH transmission when the particular repetition of the PUSCH transmission overlaps in a same slot with a preconfigured resource or a scheduled downlink measurement.

DETAILED DESCRIPTION

Figure 1:
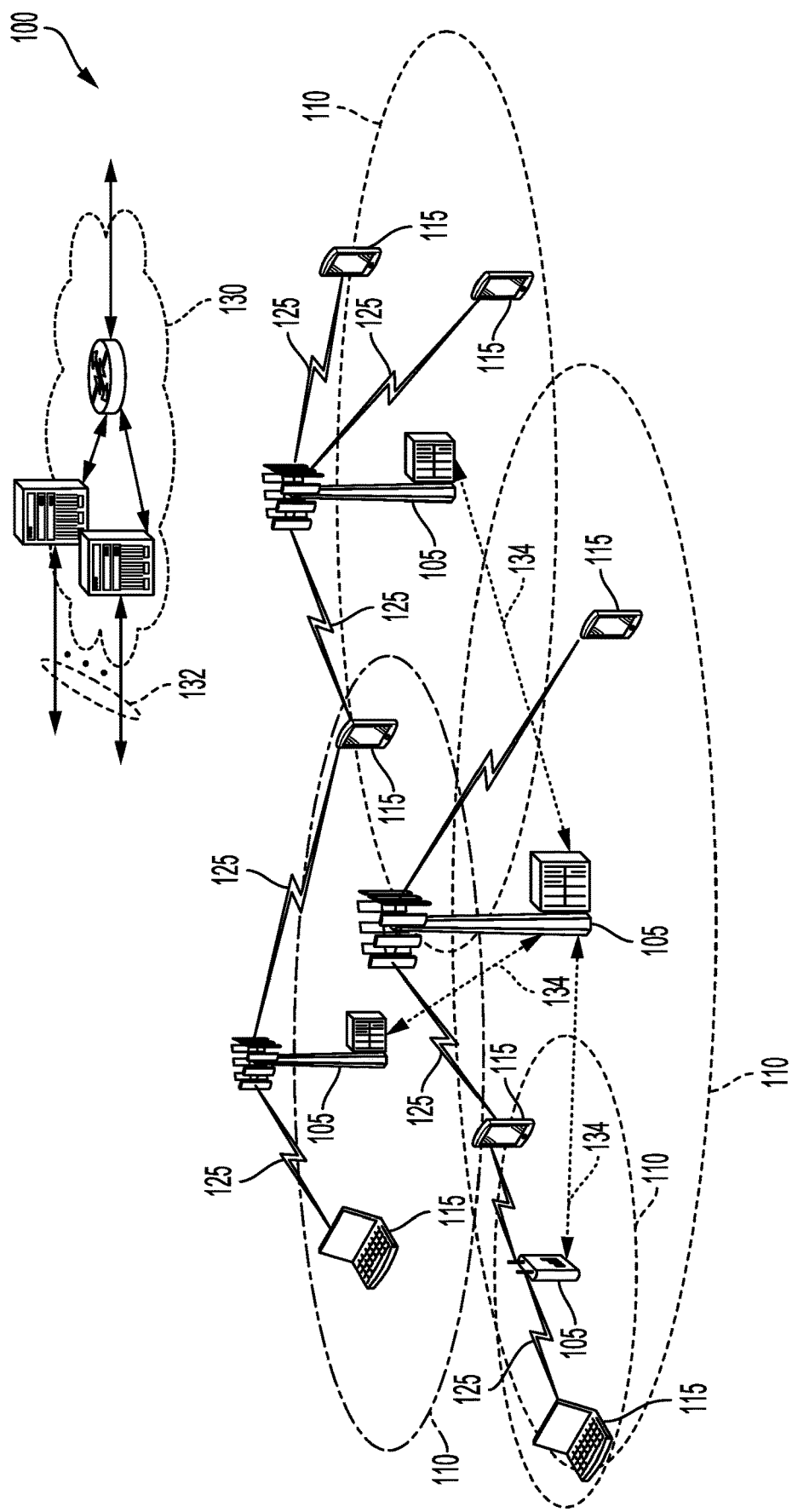
FIG. 1 illustrates an example of a system for wireless communication that supports random access uplink enhancements in accordance with aspects of the present disclosure.

In various deployments of wireless communications, including 5G New Radio (NR), for example, a UE may perform random access procedures under certain conditions, including for initial access to a network, when transitioning from an inactive or idle radio resource control (RRC) state to a connected RRC state, when performing handover from one cell to a target cell, or for certain small uplink data transmissions. In some instances, the random access procedure may be a four-step random access procedure that involves the UE transmitting a first message (MSG1) comprising a Physical Random Access Channel (RACH) preamble, receiving a second message (MSG2) comprising a random access response (RAR) that includes scheduling for a Physical Uplink Shared Channel (PUSCH) transmission, transmitting a third message (MSG3) comprising the PUSCH transmission, and receiving a fourth message (MSG4) comprising a contention resolution message on the Physical Downlink Control Channel (PDCCH) or Physical Downlink Shared Channel (PDSCH).

In some deployments, in order to improve coverage and reliability, coverage enhancement techniques are applied to certain transmissions, including PUSCH transmissions. The coverage enhancement techniques may include repetition of a transmission for coverage extension. For certain random access transmissions such as MSG3 PUSCH transmissions, however, these coverage enhancement techniques may not be supported. Nonetheless, certain deployments of 5G NR may benefit from coverage enhancement support even for MSG3 PUSCH transmissions. In some instances, NR-Light category UEs may generally require more coverage enhancement support due to lower transmission power of the NR-Light UEs. For example, NR-Light UEs may have a transmission power a few dB lower than the transmission power of a eMBB/URLLC UE. Further, NR-Light UEs may have a small number of antennas (e.g., a single antenna), which further results in reduced coverage. Coverage enhancement support may be beneficial in these instances, including for MSG3 PUSCH transmissions. Even for eMBB/URLLC UEs, MSG3 PUSCH transmissions at high frequency bands (e.g., above 24 GHz bands) may have smaller coverage and could benefit from coverage extension. In yet another example, MSG3 PUSCH transmissions may be used for sending small amounts of uplink data during RRC Inactive or Idle states. In this scenario, coverage enhancement for the MSG3 PUSCH transmission may improve reliability of the uplink data transmission.

As described in further detail in the present disclosure, MSG3 PUSCH repetition may be performed to increase coverage extension during random access procedures. A UE may repeat a particular transport block of a MSG3 PUSCH transmission across a number of consecutive slots. In some instances, the UE may use the same symbol allocation in each slot when repeating the MSG3 PUSCH transmission. The repetition may be applied to only MSG3 PUSCH retransmissions, in some examples, or to both initial transmissions as well as retransmissions. In some instances, the number of repetitions for the MSG3 transmission may be signaled to a UE in an aggregation parameter using various means. Further, the aggregation parameter may be applicable to different types of UEs within a cell, such as applicable to only UEs of a particular type or to all UEs served by a particular cell. In some instances, multiple aggregation parameter values may be signaled and/or applied to different UEs based on the type of UE or to other factors, such as to a particular UEs channel conditions or geometry. Still further, various rules or UE behavior actions may be specified to address situations where a random access repetition collides with a previously scheduled event, such as a downlink measurement event, or a preconfigured transmission on a resource that overlaps with the random access repetition.

Aspects of the disclosure are initially described in the context of a wireless communications system. Aspects of the disclosure are further illustrated by and described with reference to apparatus diagrams, system diagrams, and flowcharts that relate to support for single-code communications. The detailed description set forth below, in connection with the appended drawings and appendix, is intended as a description of various configurations and is not intended to limit the scope of the disclosure. Rather, the detailed description includes specific details for the purpose of providing a thorough understanding of the present disclosure. It will be apparent to those skilled in the art that these specific details are not required in every case and that, in some instances, well-known structures and components are shown in block diagram form for clarity of presentation.

This disclosure relates generally to enhancements for random access procedures. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5G NR networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth, for example. For other various indoor wideband implementations, using a TDD over the unlicensed portion of the 5 GHz band, the subcarrier spacing may occur with 60 kHz over a 160 MHz bandwidth, for example. Finally, for various deployments transmitting with mmWave components at a TDD of 28 GHz, subcarrier spacing may occur with 120 kHz over a 500 MHz bandwidth, for example. Other deployments of different subcarrier spacing over different bandwidths are also within the scope of the present disclosure.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates an example of a wireless communications system 100 that supports random access PUSCH enhancements in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. Each access network entity may communicate with UEs 115 through a number of other access network transmission entities, which may be referred to as a radio head, a smart radio head, a remote radio head, or a transmission/reception point (TRP). The functions performed by base stations 105 may be carried out via these network entities (e.g., TRPs). Accordingly, as described herein, the terms TRP, eNB, gNB, and base station may be used interchangeably unless otherwise noted.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), ultra-reliable low-latency communications (URLLC), NR-Light, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, NR-Light device, or an MTC device, or the like, which may be implemented in various articles such as appliances, vehicles, meters, or the like. In some implementations, such as in factory automation settings and as used in certain examples herein, a UE 115 may also refer to a sensor/actuator (S/A) unit 115 that communicates with a programmable logic controller (PLC) that acts as a TRP 105 or base station 105.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention or with minimal human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). In some examples, base stations 105 or TRPs 105 may communicate with each other through backhaul links 134 to coordinate transmission and reception of signals with UEs 115. For example, a first base station 105 may determine from CSI reports that transmissions from a neighboring base station 105 are negatively interfering with communications between the first base station 105 and the UE 115. Accordingly, the first base station 105 may inform the neighboring base station 105 via backhaul links 134 of the interference or request that the neighboring base station 105 mute transmissions on certain resources or transmit on different resources.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (Tf=307200*Ts). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In 5G NR deployments, a radio frame may have a duration of 10 ms, and one slot may comprise 14 OFDM symbols, but the number of slots in a 5G NR radio frame may vary due to flexible numerology resulting in a flexible time-slot structure. In particular, the numerology for 5G NR may include sub-carrier spacings of 15 kHz, 30 kHz, 60 kHz, or 120 kHz, depending on the system configuration and bandwidth. For example, with increased sub-carrier spacing, the symbol duration decreases while the radio frame duration would remain the same. Accordingly, if the sub-carrier spacing is increased from 15 kHz to 30 kHz, the duration of each slot is halved, resulting in 20 slots within the 10 ms radio frame.

In some wireless communications systems, a slot may further be divided into multiple mini-slots containing one or more symbols and, in some instances, a symbol of a mini-slot or a mini-slot may be the smallest unit of scheduling. In some deployments, such as in 5G NR, each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one sub-carrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain, or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz for LTE). In 5G NR, the carrier bandwidth may range from 5 MHz up to 100 MHz for sub-6 GHz frequency spectrum, and from 50 MHz up to 400 MHz for mmW frequency spectrum (above 24 GHz frequency spectrum). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs that can support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As depicted in FIG. 1, a UE 115 may communicate over wireless communication links 125 with a particular serving base station 105. In some instances, the UE 115 may initiate a random access procedure via communication link 125 with a base station 105. The random access procedure may be initiated as part of initial access, an RRC state transition from RRC Inactive/Idle states to RRC Connected state, a handover procedure as the UE 115 moves from one base station 105 to a target base station 105, or for small uplink data transmissions in RRC Inactive/Idle states. The random access procedure may include several transmission messages, including a MSG3 PUSCH transmission. In some instances, the UE 115 may comprise a low-cost or low-complexity device, such as an NR-Light device, MTC device, or NB-IoT device. As such, the UE 115 may use coverage enhancement techniques, such as repetition of certain transmissions to extend coverage. While MSG3 PUSCH transmission repetition may generally not be supported, the UE 115 may perform MSG3 PUSCH transmission repetition as described in further detail in the present disclosure in order to improve coverage of the UE's 115 random access transmissions. Further, even UEs 115 that are not considered NR-Light or low-cost devices may perform MSG3 PUSCH transmission repetition in certain instances. Other procedures and details for supporting MSG3 PUSCH enhancements are described herein.

Figure 2:
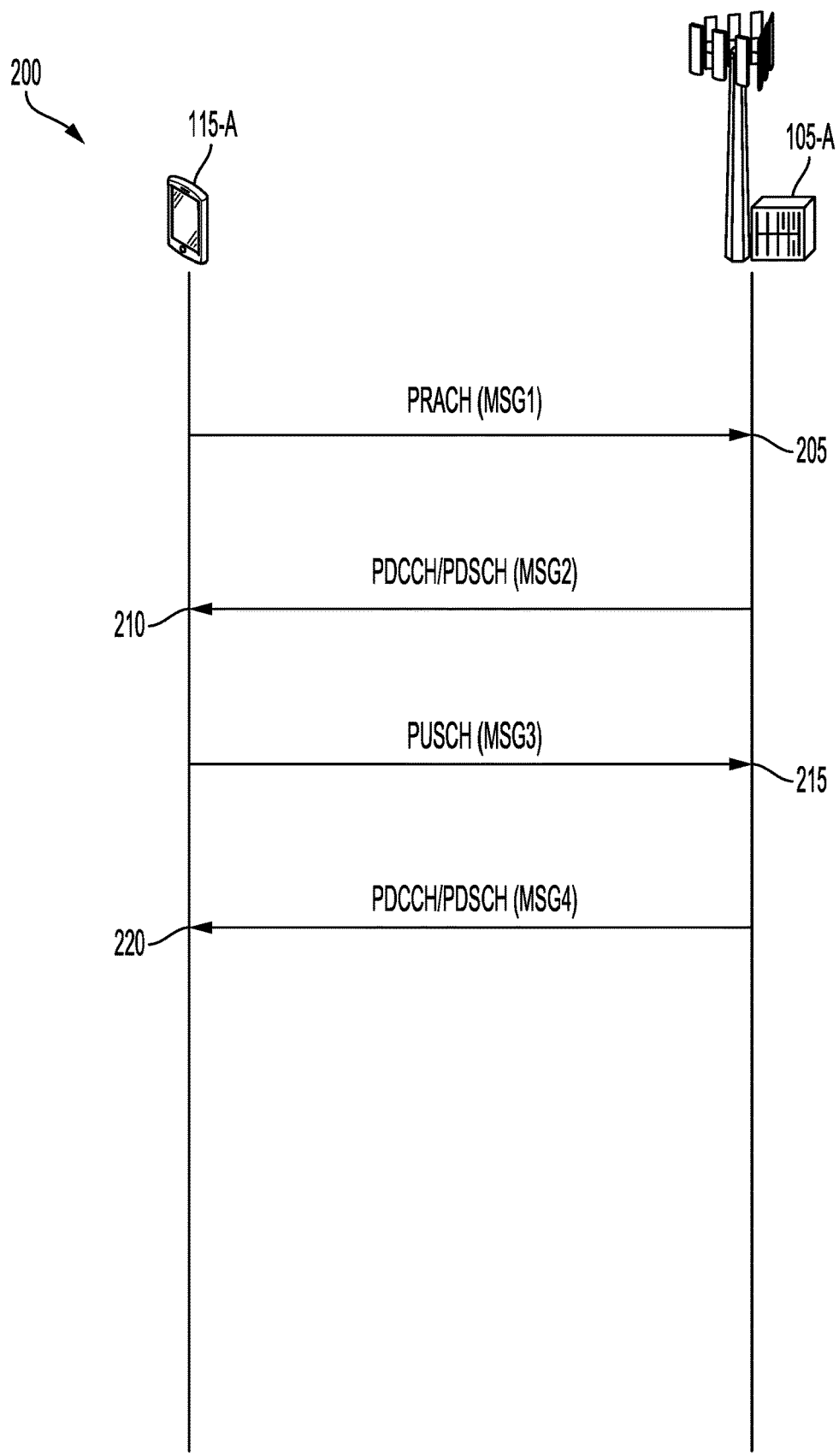
FIG. 2 illustrates an example of a system for wireless communication that supports random access uplink enhancements in accordance with aspects of the present disclosure.

FIG. 2 illustrates an example of a wireless communication system 200 that supports a four-step RACH procedure in accordance with various aspects of the present disclosure. In some examples, wireless communication system 200 may implement aspects of wireless communication system 100. For example, wireless communication system 200 includes UE 115-a and base station 105-a, which may be examples of the corresponding devices described with reference to FIG. 1. Wireless communication system 200 may support random access procedures for UEs 115-a that initiate access to a base station 105-a.

As seen in FIG. 2, a typical RACH procedure may involve four transmissions. First, a UE 115-a may transmit MSG1 on the PRACH at 205. The MSG1 transmission is a first transmission that may include a PRACH preamble, including timing information for uplink transmissions that allow the base station 105-a to set timing advance parameters, for example. In response to receiving MSG1, the base station 105-a may transmit a MSG2 transmission on the PDCCH or PDSCH at 210. The MSG2 transmission may also be referred to as a random access response (RAR) message, and the contents may include timing advance parameters or information, an uplink grant for the UE's 115-a MSG3 transmission on the uplink, a temporary cell radio network temporary identifier (TC-RNTI), and the like. In some instances, the TC-RNTI may be sent to the UE 115-a to indicate the scrambling sequence used for MSG4 transmission.

After receiving MSG2 or the RAR, the UE 115-a may then transmit MSG3 on PUSCH at 215 using resources scheduled by the uplink grant of MSG2. In some instances, the contents of MSG3 may include an RRC connection request, a scheduling request, a buffer status of the UE 1150-a, or the like. The base station 105-a may then transmit a contention resolution message referred to as MSG4 on the PDCCH or PDSCH at 220. The RACH procedure depicted in FIG. 2 may be performed in various use cases, including for initial access to a network or cell, when a UE 115-a transitions from an RRC Idle/Inactive state to an RRC Connected state (e.g., after receiving a paging message), or when a UE 115-a is changing serving base stations 105-a during a handover procedure. Further, in some instances, a UE 115-a may use the RACH procedure described above to send small uplink data transmissions during RRC Idle/

Inactive states in order to save on the overhead costs of leaving RRC Idle/Inactive states into RRC Connected state just to transmit a relatively small amount of data.

Due to poor channel conditions or other factors, some transmissions may require retransmission if the initial transmission was not received or decoded properly by the receiver. With respect to MSG3 PUSCH transmissions, the initial transmission may be scheduled by an uplink grant in the RAR while retransmissions are scheduled by a downlink control information (DCI) message having a format 0_0, with the DCI cyclic redundancy check (CRC) scrambled by the TC-RNTI provided in the corresponding RAR. In some instances, MSG3 PUSCH repetition may not be supported, whether for initial transmission or retransmission of MSG3. In contrast, repetition for general PUSCH transmissions may typically be supported. For example, for PUSCH transmissions scheduled by DCI format 0_1 in PDCCH with CRC scrambled with Cell RNTI (C-RNTI), Modulation Coding Scheme Cell RNTI (MCS-RNTI), or Configured Scheduling RNTI (CS-RNTI) with NDI=1, PUSCH transmissions may be repeated for coverage extension and improved reliability. In particular, an aggregation parameter (e.g., pusch-AggregationFactor) may indicate a number of consecutive slots in which a PUSCH transmission is to be repeated by a UE 115. In certain instances, the UE 115 may repeat a transport block (TB) across the number of consecutive slots indicated by the aggregation parameter applying the same symbol allocation in each slot.

Certain wireless communication deployments, however, may require further coverage enhancements. For example, later deployments of NR may include NR-Light UEs 115, which may be considered mid-tier or low-tier UEs 115. Examples of NR-Light UEs 115 may include wearables, industrial sensors, video monitoring devices, relaxed IT devices, and the like. Some NR-Light UEs 115 may support smaller bandwidth capabilities (e.g., 10 MHz) than regular UEs (e.g., 100 MHz or larger). NR-Light UEs 115 may comprise lower cost or lower power UEs relative to eMBB or URLLC UEs. For example, the transmission power of NR-Light UEs may be several dB lower than the transmission power of eMBB/URLLC UEs 115, while the number of transmission antennas of NR-Light UEs 115 may be smaller (e.g., a single antenna). As such, NR-Light UEs 115 may have much smaller coverage compared to that of eMBB/URLLC UEs. Further, even eMBB/URLLC UEs may have reduced coverage in high frequency bands, such as frequency bands above 24 GHz. Accordingly, MSG3 PUSCH repetition may provide coverage enhancement benefits to a variety of applications, including NR-Light UEs and other UEs operating in high frequency bands.

Figure 3:
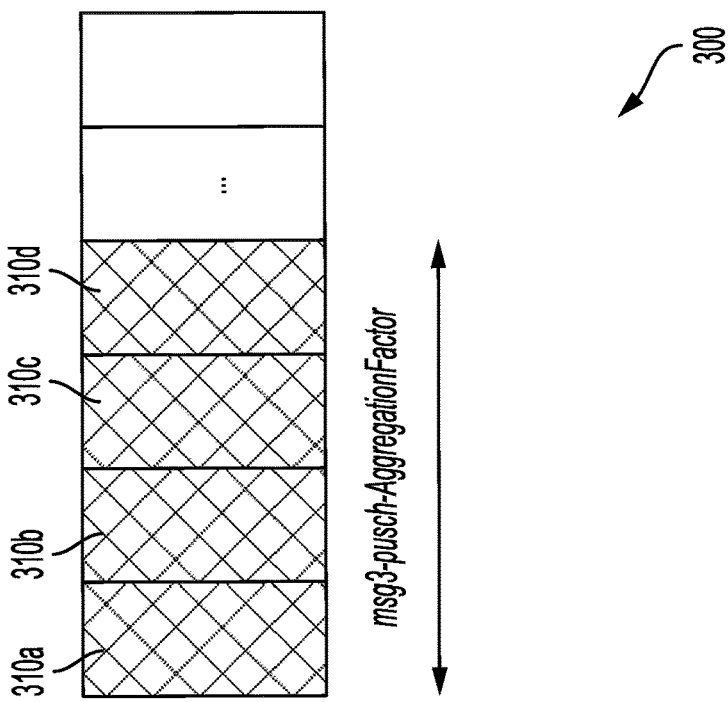
FIG. 3 illustrates an example slot structure for random access uplink enhancements in accordance with various aspects of the present disclosure.
Figure 3:
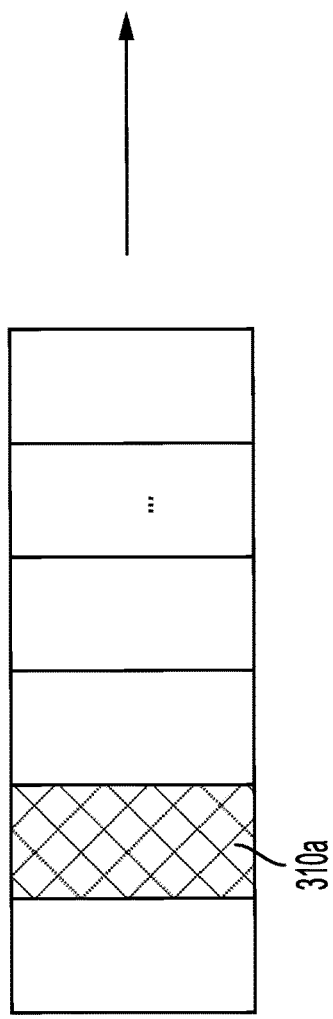

FIG. 3 illustrates an example depiction 300 of MSG3 PUSCH repetition across consecutive slots. As seen in FIG. 3, a base station 105 may schedule (e.g., via MSG2) a UE 115 for transmission of MSG3 on certain PUSCH resources during a particular slot 310a. If MSG3 repetition is supported, the UE 115 may transmit MSG3 on the scheduled PUSCH resources in slot 310a as well as on a number of consecutive subsequent slots 310b, 310c, and 310d as depicted FIG. 3. As shown in the illustrated example, the UE 115 may transmit repetitions of MSG3 based on an aggregation parameter. The aggregation parameter may indicate to the UE 115 a number of times to repeat the MSG3 transmission. As illustrated, the aggregation parameter in the present example, msg3-pusch-AggregationFactor, indicates that the UE 115 should transmit four repetitions of MSG3 in consecutive slots 310a, 310b, 310c, and 310d. In some instances, similar to how repetitions are conducted for PUSCH transmissions when scheduled by DCI, the UE 115 may use the same symbol allocation in the repeated MSG3 transmissions in slots 310b, 310c, and 310d as used in the first scheduled slot 310a. That is, the resource allocation granted by the base station 105 in MSG2 for transmission of MSG3 in PUSCH in slot 310a is the same for remaining repetitions of MSG3 in slots 310b, 310c, and 310d.

Further, in certain situations, the UE 115 may apply MSG3 repetition based on the aggregation parameter for both an initial transmission of MSG3 and any retransmission of MSG3 (e.g., due to dropped initial transmission of MSG3). In other situations, the UE 115 may apply MSG3 repetition based on the aggregation parameter for only retransmissions of MSG3. In other words, coverage enhancement techniques for MSG3 transmissions may not need to be applied in an initial transmission of MSG3. But if the initial MSG3 transmission fails, due to poor channel conditions for example, coverage enhancement techniques in the form of repetitions may be needed to successfully communicate the MSG3 transmission when it is retransmitted.

The UE 115 may determine the aggregation parameter and number of repetitions for MSG3 through various ways. For example, the UE 115 may receive the aggregation parameter through cell specific PUSCH parameters (e.g., PUSCH-ConfigCommon) via RRC signaling. In some instances, the base station 105 may transmit the aggregation parameter in the RAR in MSG2. Alternatively, or in addition, the base station 105 may indicate the aggregation parameter as part of transmission of system information. For example, the base station 105 may transmit the aggregation parameter as part of RACH configuration parameters in a first system information block (SIB1) before the start of a RACH procedure. The signaling of the aggregation parameter in cell-specific PUSCH parameters, as part of MSG2, or in SIB1, as described above, may allow the UE 115 to use the aggregation parameter for both initial transmission of MSG3 as well as retransmissions of MSG3 since the aggregation parameter is received by the UE 115 prior to initial transmission of MSG3 (which is scheduled by RAR in MSG2). In certain instances, however, the aggregation parameter may also or alternatively be signaled using DCI with format 0_0 with CRC scrambled by a TC-RNTI. In this situation, since the DCI with format 0_0 is received after the initial transmission of MSG3, the aggregation parameter would apply only to retransmission of MSG3.

The aggregation parameter or number of repetitions may also be obtained by the UE 115 without additional signaling from the base station 105. For example, the value of the aggregation parameter may be fixed in a technical specification of a wireless communications standard, such as NR. In some instances, if no indication of the aggregation parameter is provided to the UE 115, the UE 115 may assume a predefined number of repetitions. For example, the UE 115 may assume that the aggregation parameter has a default value of 1 if there is no indication of the aggregation parameter, which would result in only one transmission of MSG3 PUSCH with no repetitions. Other default values of the aggregation parameter are also included in the scope of the present disclosure.

Although a particular UE 115 that receives an aggregation parameter may apply repetitions to MSG3 PUSCH transmissions based on the aggregation parameter value, the network may need to factor in the conditions and types of other and different UEs served by a base station 105 when signaling the aggregation parameter. Accordingly, multiple aggregation parameter values may be signaled and/or applied to different UEs based on the type of UE or to other factors, such as to a particular UEs channel conditions or geometry.

For example, a base station 105 may transmit, or a UE 115 may determine (e.g., via fixed value in a technical specification), a single value of the aggregation parameter that applies to all UEs 115 served by the base station 105. All UE 115 served by the base station 105, regardless of whether the UE 115 is categorized as an eMBB, URLLC, NR-Light, or some other type of UE 115, would apply the aggregation parameter for MSG3 PUSCH repetitions. In some instances, the different values of the aggregation parameter may be configured based on type of UEs. For example, there may be multiple values of the aggregation parameter configured for different types of UEs 115. such as a single value of the aggregation parameter configured for eMBB/URLLC UEs and a different value of the aggregation parameter configured for NR-Light UEs that require more coverage enhancement. Alternatively, the aggregation parameter may apply only to one type of UE 115, such as only to NR-Light UEs 115, while other types of UEs would not have MSG3 repetition configured for them. In yet another instance, multiple values of the aggregation parameter may be configured for a UE 115, and the particular value used for MSG3 repetition may be determined based on UE 115 geometry. For example, depending on the channel conditions associated with the UE 115 based on channel quality measurements of downlink channels or reference signals, a UE 115 may need different amounts of MSG3 PUSCH repetitions. A UE 115 operating under ideal channel conditions may not need any MSG3 repetitions, while a UE 115 operating under poor channel conditions may need a larger number of MSG3 repetitions. In these instances, the UE 115 may determine which value of the aggregation parameter to use based on the UE's 115 geometry.

Figure 4:
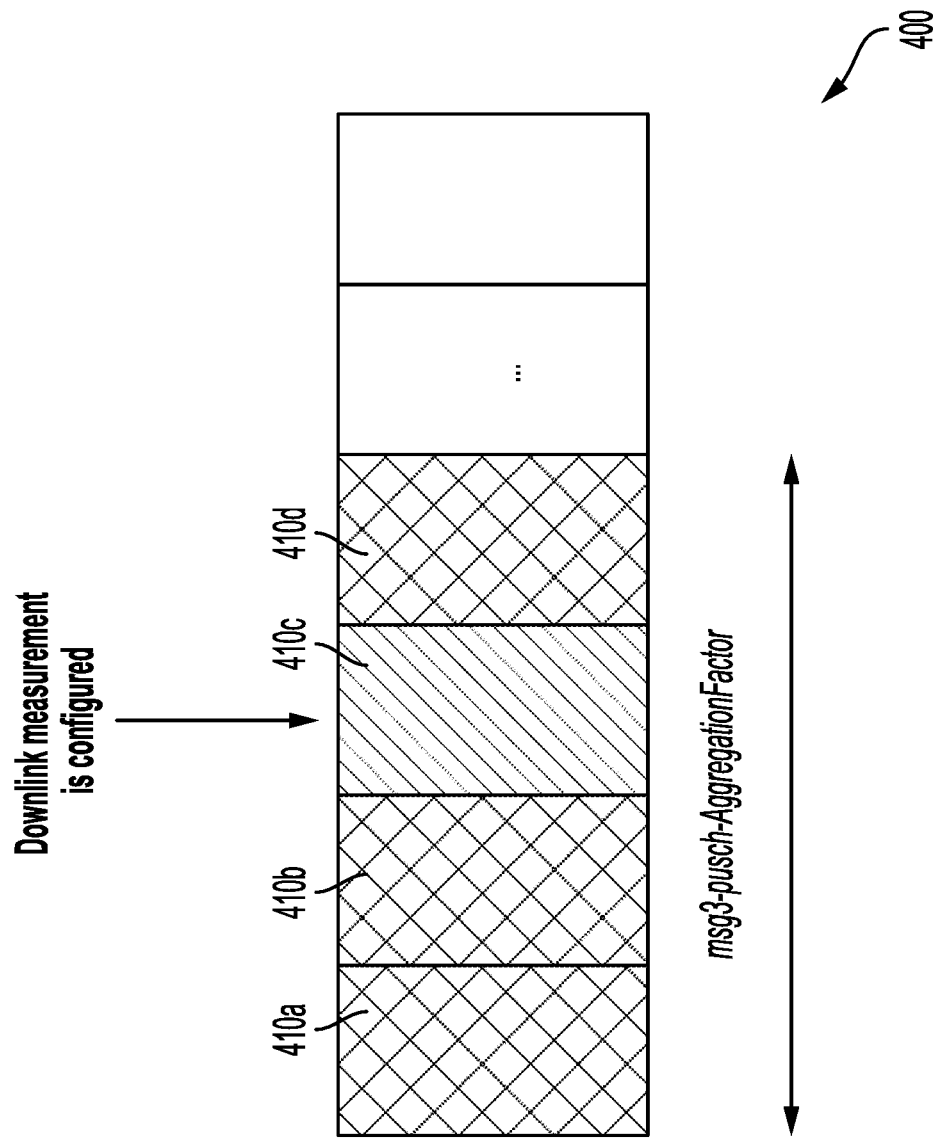
FIG. 4 illustrates an example slot structure for random access uplink enhancements in accordance with various aspects of the present disclosure.

FIG. 4 illustrates an example slot structure 400 depicting collision of MSG3 repetitions with a pre-configured event or transmission. In some instances, the repetitions of MSG3 transmission may overlap or collide with other events or transmissions. A set of predefined rules or actions may be configured to address UE 115 behavior in the event of a collision. As seen in FIG. 4, a UE 115 may transmit MSG3 repetitions in four consecutive slots 410a, 410b, 410c, and 410d. In the illustrated example, however, one of the slots 410c used for MSG3 repetitions may also be previously scheduled for a different event or transmission. Examples of conflicting scheduled events may include a downlink measurement event (e.g., RRM or positioning measurement) where the UE 115 is scheduled to measure downlink signals. The conflicting event may also comprise a situation where the same resources in slot 410c are scheduled for other transmissions or monitoring occasions (e.g., a RACH occasion or PUSCH resource unit of a two-step RACH procedure).

Various priority rules may be defined to address situations where aggregated slots collide with preconfigured resources or any scheduled downlink measurement event. In some instances, a UE 115 may prioritize the scheduled downlink measurement or conflicting event over a MSG3 repetition. In the example of FIG. 4, although slot 410c is intended to include a repetition of MSG3, the slot 410c is also configured for a downlink measurement. Using this priority rule, the UE 115 may determine not to repeat the MSG3 transmission in slot 410c and perform the scheduled downlink measurement instead. In contrast, the UE 115 may prioritize the MSG3 repetition over the scheduled downlink measurement or conflicting event. In this case, the UE 115 may transmit the MSG3 repetition in slot 410c while ignoring the preconfigured resources or scheduled downlink measurements for slot 410c.

Further, the priority rules for UE behavior in the case of collision during MSG3 repetition may be based on an RRC state of the UE 115. For example, during a handover event, the network may benefit from uninterrupted connections among the UE 115 and the base stations 105 that the UE 115 is transitioning from and to. As such, the UE 115 may maintain repetitions during the handover procedure to improve the chances for uninterrupted connections. In an example, the UE 115 may maintain MSG3 repetitions in slot 410c in the event of collision if the UE 115 is in an RRC Connected state during handover. In contrast, the UE 115 may determine not to maintain MSG3 repetitions during slot 410c in the event of collision if the UE 114 is in an RRC Idle/Inactive state. Still further, in some instances, the UE 115 may assume that the base station 105 does not schedule resources that would lead to collision between a MSG3 repetition and a previously scheduled event or transmission. As such, in the event of a collision notwithstanding the rule above, the UE 115 may determine that the collision should be treated as an error case.

Figure 5:
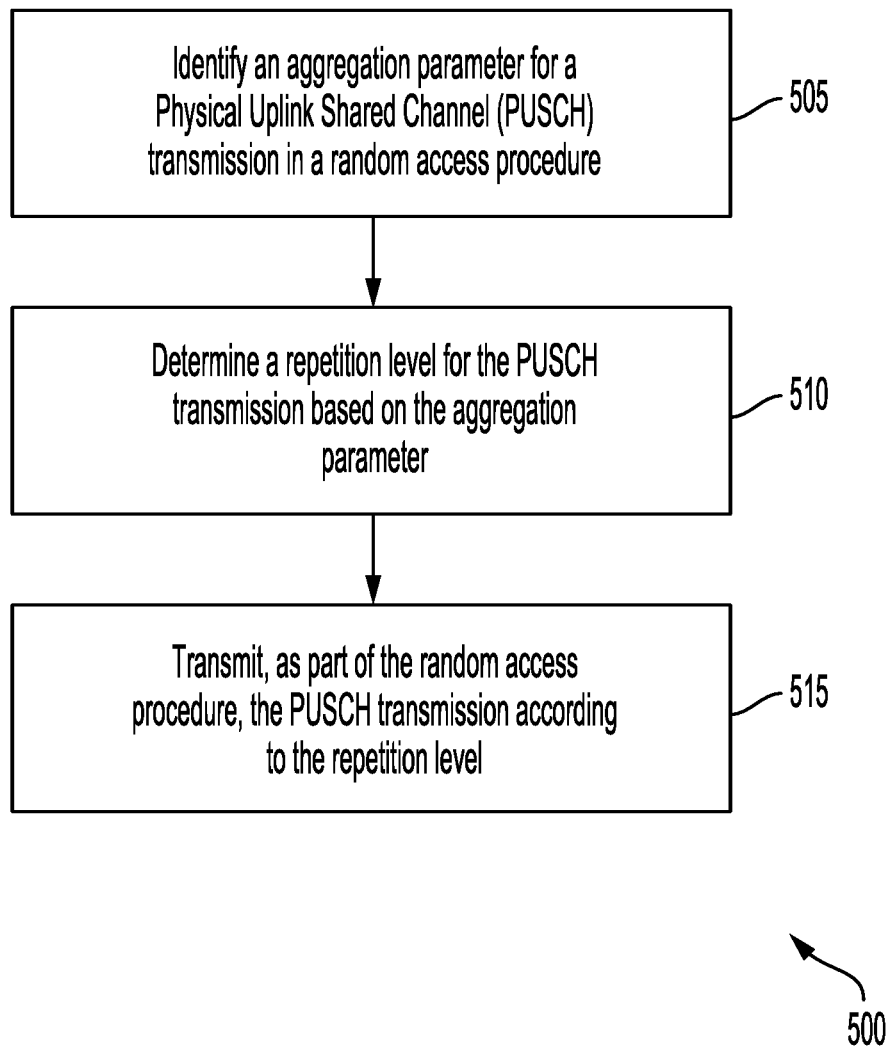
FIGS. 5-6 illustrate example methods for random access uplink enhancements in accordance with aspects of the present disclosure.

FIG. 5 shows a flowchart illustrating a method 500 for MSG3 PUSCH enhancements in wireless communications in accordance with aspects of the present disclosure. The operations of method 500 may be implemented by a UE 115 or its components as described herein. For example, the operations of method 500 may be performed by a communications manager as described with reference to FIG. 7. In some examples, a UE 115 may execute a set of codes to control the functional elements of the device to perform the functions described below. Additionally or alternatively, the UE 115 may perform aspects of the functions described below using special-purpose hardware.

At 505, the UE 115 may identify an aggregation parameter for a Physical Uplink Shared Channel (PUSCH) transmission in a random access procedure. The PUSCH transmission may comprise a MSG3 transmission as described in the disclosure herein. The UE 115 may identify the aggregation parameter through different operations. For example, the UE 115 may receive the aggregation parameter in cell-specific PUSCH parameters in RRC signaling, in a random access response (e.g., MSG2), as part of a random access configuration in a system information block (e.g., SIB1), or in DCI scrambled by a TC-RNTI. In some instances, the UE 115 may identify the aggregation parameter based on a fixed value specified in a technical specification for wireless communications (e.g., NR standards). In certain instances, if no aggregation parameter is indicated or specified, the UE 115 may assume a value of one for the aggregation parameter, meaning a single transmission with no repetitions.

The aggregation parameter may be applied to different UEs 115 based on various factors, or multiple values of the aggregation parameter may be applied based on various factors. In some instances, the aggregation parameter comprises a value indicating repetition level for all UEs (e.g., eMBB/URLLC/NR-Light, etc.) in a cell. In certain instances, the aggregation parameter comprises either a first value indicating repetition level for a first type of UE (e.g., eMBB/URLLC UEs) or a second value indicating repetition level for a second type of UE (e.g., NR-Light UEs). In other instances, the aggregation parameter may comprise a value indicating repetition level for just a particular type of UE (e.g., NR-Light UEs). Additionally, or alternatively, the aggregation parameter comprises a plurality of values indicating different repetition levels of the MSG3 PUSCH transmission, and the UE 115 may select one of the plurality of values for applying a repetition level to the MSG3 PUSCH transmission based on a channel quality measurement.

At 510, the UE 115 may determine a repetition level for the PUSCH transmission based on the aggregation parameter. In some instances, the aggregation parameter is a value indicating a number of consecutive slots in which to repeat the PUSCH transmission. At 515, the UE 115 may transmit, as part of the random access procedure, the PUSCH transmission according to the repetition level. In some instances, each PUSCH repetition is transmitted with a same symbol allocation as other PUSCH repetitions of the same MSG3 transmission. The UE 115 may transmit an initial PUSCH transmission according to the repetition level, a retransmission of the PUSCH transmission according to the repetition level, or both according to the repetition level.

Although not explicitly illustrated in FIG. 5, the UE 115 may perform additional operations to support MSG3 PUSCH enhancements. For example, the UE 115 may determine that at least one particular repetition of the PUSCH transmission overlaps in a same slot with a preconfigured resource or a scheduled downlink measurement. In view of this overlap or "collision," the UE 115 may refrain from transmitting the particular repetition of the PUSCH transmission (i.e., "drop" the particular repetition from the series of consecutive repetitions indicated by the aggregation parameter). Alternatively, the UE 115 may instead transmit the particular repetition of the PUSCH transmission but drop communication on the preconfigured resource or drop the scheduled downlink measurement. In some instances, the determination of whether to transmit or drop the particular repetition of the PUSCH transmission is based on a radio resource control (RRC) state of the UE 115.

Figure 6:
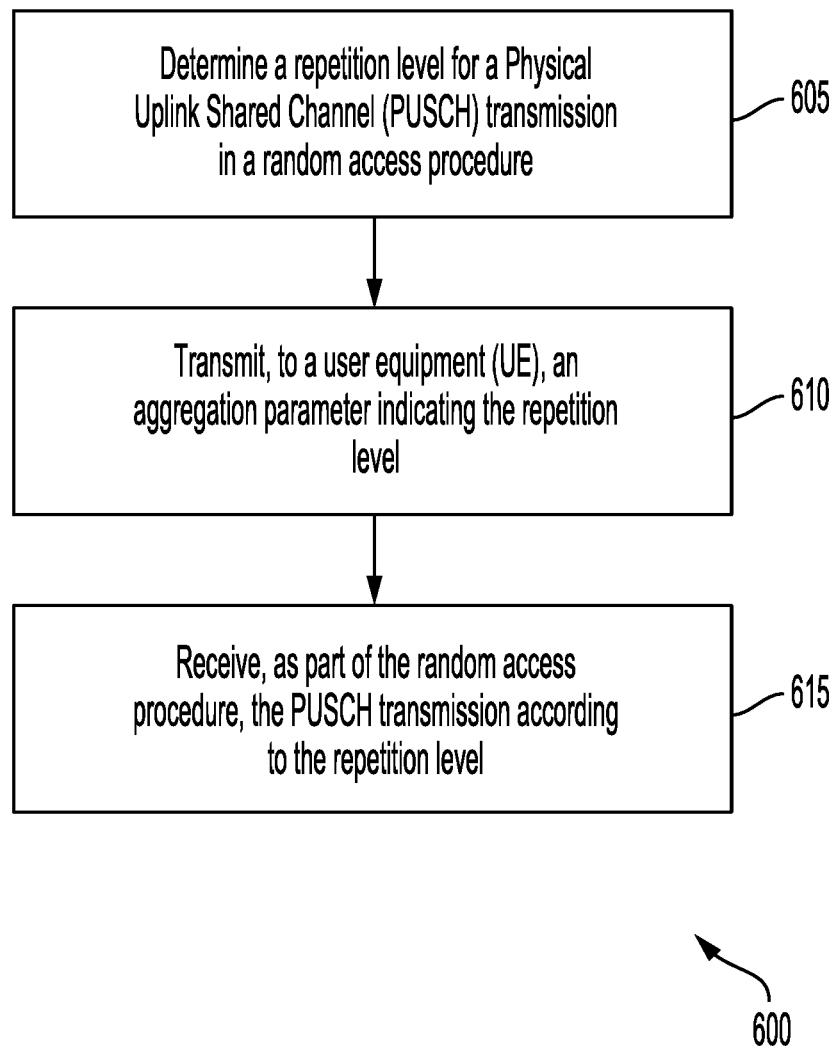

FIG. 6 shows a flowchart illustrating a method 600 for support for MSG3 PUSCH enhancements in wireless communications in accordance with aspects of the present disclosure. The operations of method 600 may be implemented by a base station 105 or its components as described herein. For example, the operations of method 600 may be performed by a communications manager as described with reference to FIG. 7. In some examples, a base station 105 may execute a set of codes to control the functional elements of the device to perform the functions described below. Additionally or alternatively, the base station 105 may perform aspects of the functions described below using special-purpose hardware.

At 605, the base station 105 determines a repetition level for a Physical Uplink Shared Channel (PUSCH) transmission in a random access procedure. At 610, the base station 105 transmits, to a user equipment (UE), an aggregation parameter indicating the repetition level. The base station 105 may transmit the aggregation parameter in cell-specific PUSCH parameters in radio resource control (RRC) signaling, in a random access response (e.g., MSG2), as part of a random access configuration in a system information block (e.g., SIB1), or in DCI scrambled by a TC-RNTI.

The aggregation parameter may be applied differently to different UEs 115 based on various factors, or the base station 105 may transmit different values of the aggregation parameters for different UEs. In some instances, the aggregation parameter comprises a value indicating repetition level for all UEs (e.g., eMBB/URLLC/NR-Light, etc.) in a cell. In certain instances, the aggregation parameter comprises either a first value indicating repetition level for a first type of UE (e.g., eMBB/URLLC UEs) or a second value indicating repetition level for a second type of UE (e.g., NR-Light UEs). In other instances, the aggregation parameter may comprise a value indicating repetition level for just a particular type of UE (e.g., NR-Light UEs). Additionally, or alternatively, the aggregation parameter comprises a plurality of values indicating different repetition levels of the MSG3 PUSCH transmission. The UE 115 may determine how to select a particular value to use for applying repetition to a particular MSG PUSCH transmission.

At 615, the base station 105 may receive, as part of the random access procedure, the PUSCH transmission according to the repetition level. In some instances, the PUSCH transmission is received with a same symbol allocation in each slot where each PUSCH repetition is received according to the repetition level. The PUSCH transmission may include initial transmission or retransmission of the PUSCH transmission according to the repetition level, or both.

Although not explicitly illustrated in FIG. 5, the base station 105 may perform additional operations to support MSG3 PUSCH enhancements. For example, in some instances, a particular repetition of a PUSCH transmission may overlap, or "collide," with a preconfigured resource or a scheduled downlink measurement. Accordingly, the base station 105 may not receive a particular repetition of the PUSCH transmission when the particular repetition of the PUSCH transmission overlaps in a same slot with a preconfigured resource or a scheduled downlink measurement. Alternatively, the base station may receive a particular repetition of the PUSCH transmission when the particular repetition of the PUSCH transmission overlaps in a same slot with a preconfigured resource or a scheduled downlink measurement.

Figure 7:
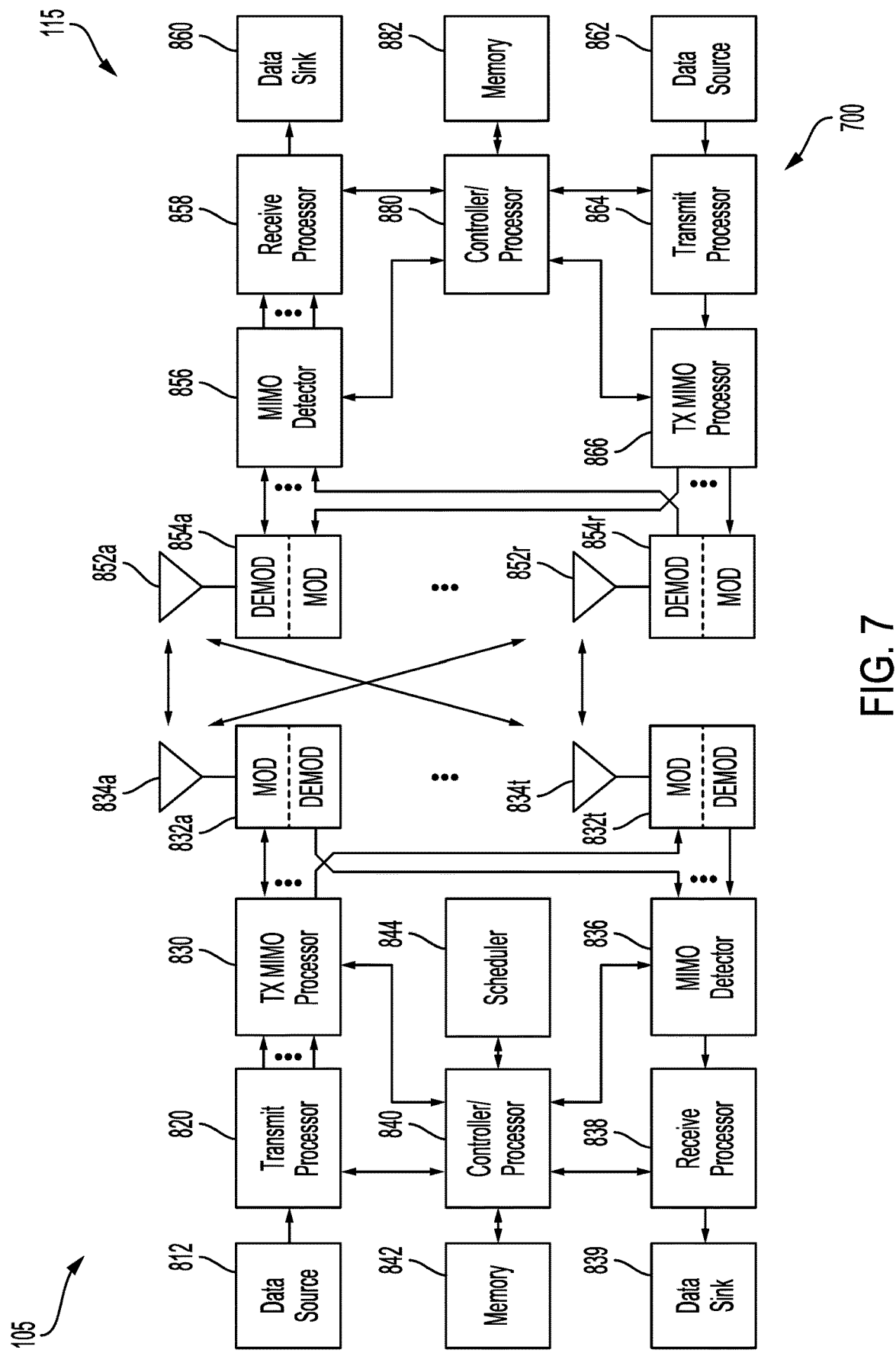
FIG. 7 is a block diagram illustrating a design of a base station/gNB/TRP and a UE configured according to one aspect of the present disclosure.

FIG. 7 shows a block diagram 700 of a design of a base station/eNB/gNB 105 and a UE 115, which may be one of the base stations/eNBs/gNBs and one of the UEs in FIG. 1. At the eNB 105, a transmit processor 820 may receive data from a data source 712 and control information from a controller/processor 740. The control information may be for various control channels such as the PBCH, PCFICH, PHICH, PDCCH, EPDCCH, MPDCCH etc. The data may be for the PDSCH, etc. The transmit processor 720 may process (e.g., encode and symbol map) the data and control information to obtain data symbols and control symbols, respectively. The transmit processor 720 may also generate reference symbols, e.g., for the PSS, SSS, and cell-specific reference signal. A transmit (TX) multiple-input multiple-output (MIMO) processor 730 may perform spatial processing (e.g., precoding) on the data symbols, the control symbols, and/or the reference symbols, if applicable, and may provide output symbol streams to the modulators (MODs) 732*a* through 732*t*. Each modulator 732 may process a respective output symbol stream (e.g., for OFDM, etc.) to obtain an output sample stream. Each modulator 732 may further process (e.g., convert to analog, amplify, filter, and upconvert) the output sample stream to obtain a downlink signal. Downlink signals from modulators 732*a* through 732*t* may be transmitted via the antennas 734*a* through 734*t*, respectively. The downlink signals may include random access procedure messages, such as MSG2 random access response messages on PDCCH or PDSCH or MSG4 contention resolution messages on PDCCH or PDSCH. The downlink signals may also include a transmission of an aggregation parameter for the UE 115 to apply a number of repetitions to uplink random access transmissions, such as MSG3 PUSCH transmissions, as described above with reference to FIGS. 2-6.

At the UE 115, the antennas 752a through 752r may receive the downlink signals from the eNB 105 and may provide received signals to the demodulators (DEMODs) 754a through 754r, respectively. Each demodulator 754 may condition (e.g., filter, amplify, downconvert, and digitize) a respective received signal to obtain input samples. Each demodulator 754 may further process the input samples (e.g., for OFDM, etc.) to obtain received symbols. A MIMO detector 756 may obtain received symbols from all the demodulators 754a through 754r, perform MIMO detection on the received symbols if applicable, and provide detected symbols. A receive processor 758 may process (e.g., demodulate, deinterleave, and decode) the detected symbols, provide decoded data for the UE 115 to a data sink 760, and provide decoded control information to a controller/processor 780.

On the uplink, at the UE 115, a transmit processor 764 may receive and process data (e.g., for the PUSCH) from a data source 762 and control information (e.g., for the PUCCH) from the controller/processor 780. The transmit processor 764 may also generate reference symbols for a reference signal. The symbols from the transmit processor 764 may be precoded by a TX MIMO processor 766 if applicable, further processed by the modulators 754a through 754r (e.g., for SC-FDM, etc.), and transmitted to the eNB 105. The transmissions to the eNB 105 may include random access messages, such as a MSG1 PRACH preamble message or MSG3 PUSCH transmissions, for example. At the eNB 105, the uplink signals from the UE 115 may be received by the antennas 734, processed by the demodulators 732, detected by a MIMO detector 736 if applicable, and further processed by a receive processor 738 to obtain decoded data and control information sent by the UE 115. The processor 738 may provide the decoded data to a data sink 739 and the decoded control information to the controller/processor 740.

The controllers/processors 740 and 780 may direct the operation at the eNB 105 and the UE 115, respectively. The controller/processor 740 and/or other processors and modules at the eNB 105 may perform or direct the execution of the functional blocks illustrated in FIG. 6, and/or other various processes for the techniques described herein. The controllers/processor 780 and/or other processors and modules at the UE 115 may also perform or direct the execution of the functional blocks illustrated in FIG. 5, and/or other processes for the techniques described herein. The memories 742 and 782 may store data and program codes for the eNB 105 and the UE 115, respectively. For example, memory 742 may store instructions that, when performed by the processor 740 or other processors depicted in FIG. 7, cause the base station 105 to perform operations described with respect to FIG. 6. Similarly, memory 782 may store instructions that, when performed by processor 780 or other processors depicted in FIG. 7 cause the UE 115 to perform operations described with respect to FIG. 5. A scheduler 744 may schedule UEs for data transmission on the downlink and/or uplink.

While blocks in FIG. 7 are illustrated as distinct components, the functions described above with respect to the blocks may be implemented in a single hardware, software, firmware, or combination component or in various combinations of components. For example, the functions described with respect to the transmit processor 720, the receive processor 738, or the TX MIMO processor 730 may be performed by or under the control of processor 740.

Figure 8:
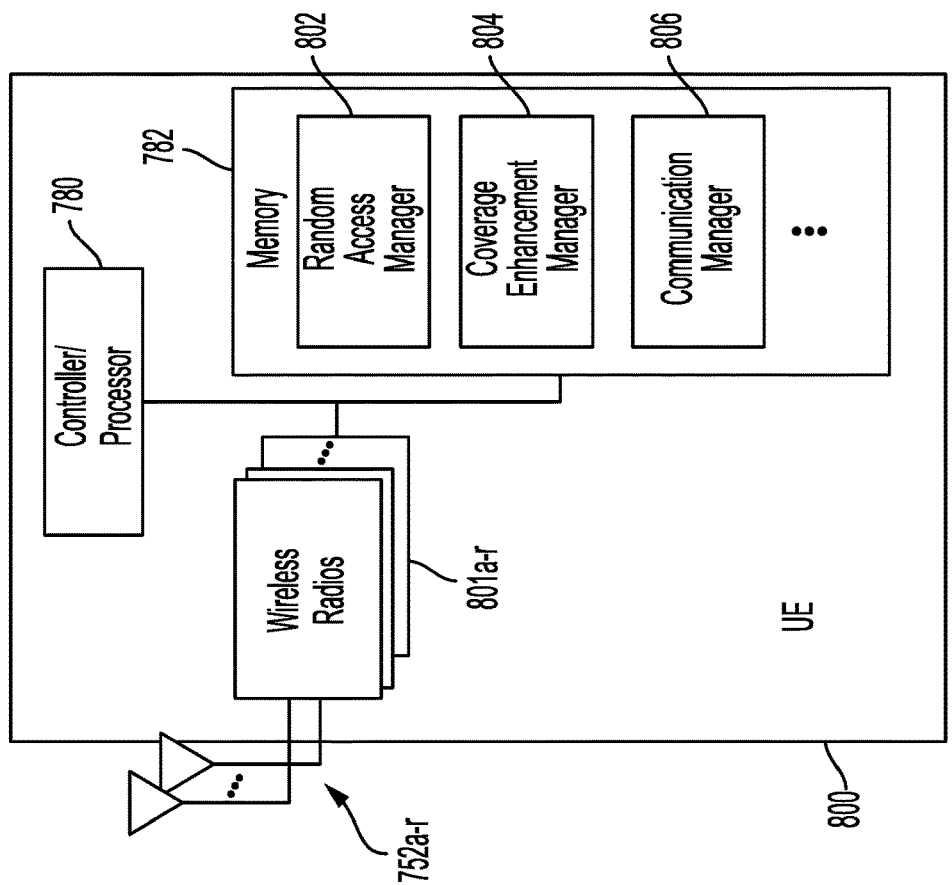
FIG. 8 is a block diagram illustrating a UE configured according to some embodiments of the present disclosure.

Turning now to FIG. 8, a UE 800, such as a UE 115 (see FIG. 7), may have a controller/processor 780, a memory 782, and antennas 752a through 752r, as described above with respect to FIG. 7. UE 800 may also have wireless radios 801a to 801r that comprise additional components also described above with reference to FIG. 7. The memory 782 of UE 800 stores one or more algorithms that configure processor/controller 780 to carry out one or more procedures including, for example, those described above with reference to FIG. 5.

One or more algorithms stored by memory 782 configure processor/controller 780 to carry out one or more procedures relating to wireless communication by the UE 800, as previously described. For example, a random access manager 802 may configure controller/processor 880 to perform operations that include coordinating random access procedures and generating or receiving random access messages, as described above with reference to FIG. 2, for transmission and reception using wireless radios 801a-r and antennas 752a-r. The random access messages may include MSG3 PUSCH transmissions transmitted by UE 800 to gNB 900. A coverage enhancement manager 804 may configure controller/processor 780 to identify an aggregation parameter for PUSCH transmissions (e.g., MSG3) associated with a random access procedure and determine a repetition level for the PUSCH transmissions based on the aggregation parameter. Also, a communication manager 806 may configure controller/processor 780 to carry out operations including communicating, via wireless radios 801a to 801r, on a control or shared channel, the PUSCH transmission, as part of the random access procedure, according to the repetition level. Other operations as described above may be carried out by one or more of the described algorithms or components 802, 804, 806 and/or their various subcomponents.

Each of the illustrated components 802, 804, and 806 and/or at least some of their various sub-components may be implemented in hardware, software executed by a processor, firmware, or any combination thereof. If implemented in software executed by a processor, the functions of the random access manager 802, coverage enhancement manager 804, communication manager 806 and/or at least some of their various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The random access manager 802, coverage enhancement manager 804, communication manager 806 and/or at least some of their various sub-components may be physically located at various positions, including being distributed such that portions of functions are implemented at different physical locations by one or more physical devices. In some examples, random access manager 802, coverage enhancement manager 804, communication manager 806 and/or at least some of their various sub-components may be a separate and distinct component in accordance with various aspects of the present disclosure. In other examples, random access manager 802, coverage enhancement manager 804, communication manager 806 and/or at least some of their various sub-components may be combined with one or more other hardware components, including but not limited to an I/O component, a transceiver, a network server, another computing device, one or more other components described in the present disclosure, or a combination thereof in accordance with various aspects of the present disclosure.

Figure 9:
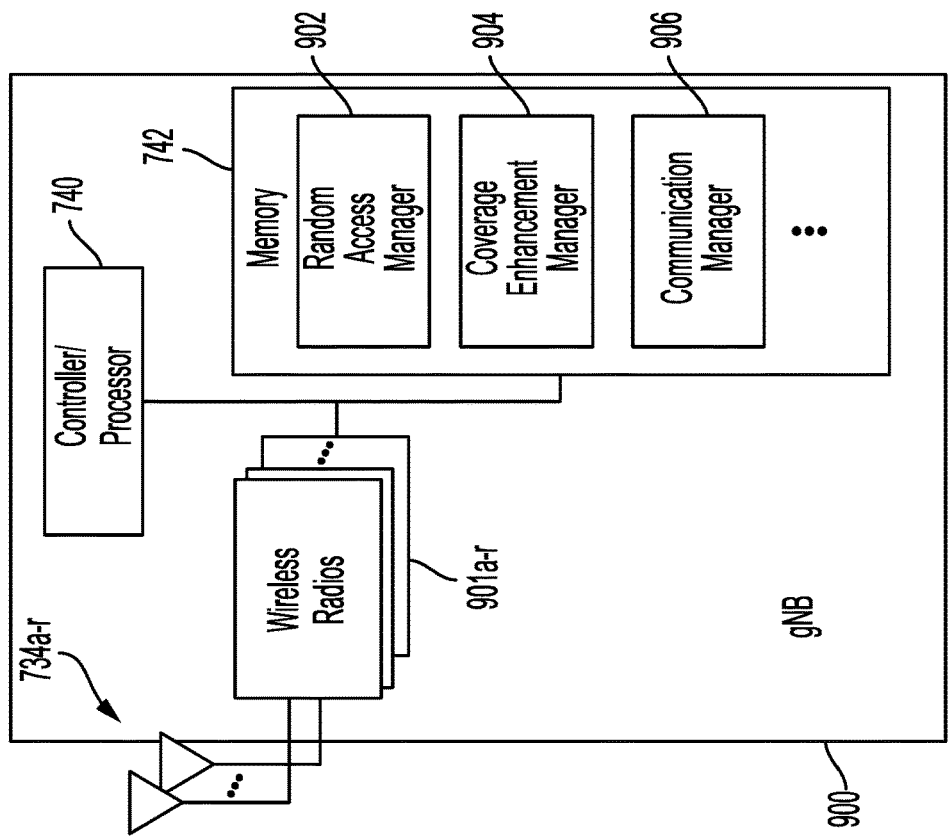
FIG. 9 is a block diagram illustrating a base station configured according to some embodiments of the present disclosure.

Referring now to FIG. 9, a base station 900, such as a base station 105 (see FIG. 7), may have a controller/processor 740, a memory 742, and antennas 734a through 734t, as described above. The base station 900 may also have wireless radios 901a to 901t that comprise additional components also described above with reference to FIG. 7. The memory 742 of base station 900 stores one or more algorithms that configure processor/controller 740 to carry out one or more procedures as described above with reference to FIG. 6.

One or more algorithms stored by memory 742 configure processor/controller 740 to carry out one or more operations relating to wireless communication by the base station 900, as previously described. For example, a random access manager 902 configures controller processor 740 to carry out operations that include coordinating random access procedures and generating or receiving random access messages, as described above with reference to FIG. 2, for transmission and reception using wireless radios 901a-r and antennas 734a-r. The random access messages may include MSG3 PUSCH transmissions transmitted by UE 800 to gNB 900. A coverage enhancement manager 904 may configure controller/processor 740 to determine a repetition level for PUSCH transmission (e.g., MSG3) associated with a random access procedure and generate an aggregation parameter indicating the repetition level. Also, a communication manager 906 may configure controller/processor 740 to carry out operations including transmitting the aggregation parameter indicating the repetition level and receiving, as part of the random access procedure, the PUSCH transmission according to the repetition level, via wireless radios 901a to 901r and antennas 734a to 734r. Other operations as described above may be carried out by one or more of the described algorithms or components 902, 904, 906 and/or their various subcomponents.

Each of the illustrated components 902, 904, and 906 and/or at least some of their various sub-components may be implemented in hardware, software executed by a processor, firmware, or any combination thereof. If implemented in software executed by a processor, the functions of the random access manager 902, coverage enhancement manager 904, communication manager 906 and/or at least some of their various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The random access manager 902, coverage enhancement manager 904, communication manager 906 and/or at least some of their various sub-components may be physically located at various positions, including being distributed such that portions of functions are implemented at different physical locations by one or more physical devices. In some examples, random access manager 902, coverage enhancement manager 904, communication manager 906 and/or at least some of their various sub-components may be a separate and distinct component in accordance with various aspects of the present disclosure. In other examples, random access manager 902, coverage enhancement manager 904, communication manager 906 and/or at least some of their various sub-components may be combined with one or more other hardware components, including but not limited to an I/O component, a transceiver, a network server, another computing device, one or more other components described in the present disclosure, or a combination thereof in accordance with various aspects of the present disclosure.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication performed by a user equipment (UE), comprising:

determining a first repetition level for an initial transmission of a Physical Uplink Shared Channel (PUSCH) transmission in a random access procedure and a second repetition level for a retransmission of the PUSCH transmission based at least in part on:

receiving, in a single transmission before a start of the random access procedure, a plurality of values that are each associated with a different repetition level of a plurality of repetition levels that includes the first repetition level and the second repetition level, wherein at least one of the plurality of values is associated with the initial transmission of the PUSCH transmission and the retransmission of the PUSCH transmission, or identifying, when the UE does not receive the single transmission, the plurality of values from a technical specification; and transmitting, as part of the random access procedure, the initial transmission of the PUSCH transmission, according to a first quantity of repetitions associated with the first repetition level, and the retransmission of the PUSCH transmission, according to a second quantity of repetitions associated with the second repetition level, wherein the first quantity of repetitions is a same or different as the second quantity of repetitions.

2. The method of claim 1, wherein the transmitting comprises at least one of:

transmitting the initial transmission of the PUSCH transmission with a same symbol allocation in each slot where the initial transmission of the PUSCH transmission is transmitted according to the first repetition level, or transmitting the retransmission of the PUSCH transmission with the same symbol allocation in each slot where the retransmission of the PUSCH transmission is transmitted according to the second repetition level.

3. The method of claim 1, wherein the first repetition level and the second repetition level are further determined based at least in part on a random access response message.

4. The method of claim 1, wherein the first repetition level and the second repetition level are further determined based at least in part on downlink control information (DCI) scrambled by a temporary cell random network temporary identifier (TC-RNTI).

5. The method of claim 1, further comprising identifying, when the UE does not receive the single transmission, the plurality of values from the technical specification.

6. The method of claim 1, wherein at least one of the plurality of values is for all UEs in a cell.

7. The method of claim 1, wherein at least one of:

a first value of the plurality of values is for a first type of UE, or a second value of the plurality of values is for a second type of UE, and wherein the UE is of the first type of UE or the second type of UE.

8. The method of claim 1, wherein each of the plurality of values is for a particular type of UE that is the UE.

9. The method of claim 1, further comprising selecting at least one of the plurality of values based at least in part on a channel quality measurement.

10. The method of claim 1, further comprising determining that at least one particular repetition of at least one of the initial transmission of the PUSCH transmission or the retransmission of the PUSCH transmission overlaps in a same slot with a preconfigured resource or a scheduled downlink measurement.

11. An apparatus for wireless communications, comprising:

a processor;

memory coupled with the processor; and instructions stored in the memory and operable, when executed by the processor, to cause the apparatus to:

determine a first repetition level for an initial transmission of a Physical Uplink Shared Channel (PUSCH) transmission in a random access procedure and a second repetition level for a retransmission of the PUSCH transmission based at least in part on:

receiving, in a single transmission before a start of the random access procedure, a plurality of values that are each associated with a different repetition level of a plurality of repetition levels that includes the first repetition level and the second repetition level, wherein at least one of the plurality of values is associated with the initial transmission of the PUSCH transmission and the retransmission of the PUSCH transmission, or identifying, when the apparatus does not receive the single transmission, the plurality of values from a technical specification; and transmit, as part of the random access procedure, the initial transmission of the PUSCH transmission, according to a first quantity of repetitions associated with the first repetition level, and the retransmission of the PUSCH transmission, according to a second quantity of repetitions associated with the second repetition level, wherein the first quantity of repetitions is a same or different as the second quantity of repetitions.

12. The apparatus of claim 11, wherein the instructions, operable to cause the apparatus to transmit at least one of the initial transmission of the PUSCH transmission or the retransmission of the PUSCH transmission, are operable to cause the apparatus to:

transmit the initial transmission of the PUSCH transmission with a same symbol allocation in each slot where the initial transmission of the PUSCH transmission is transmitted according to the first repetition level, or transmit the retransmission of the PUSCH transmission with the same symbol allocation in each slot where the retransmission of the PUSCH transmission is transmitted according to the second repetition level.

13. The apparatus of claim 11, wherein the first repetition level and the second repetition level are further based at least in part on a random access response message.

14. The apparatus of claim 11, wherein the first repetition level and the second repetition level are further based at least in part on downlink control information (DCI) scrambled by a temporary cell random network temporary identifier (TC-RNTI).

15. The apparatus of claim 11, further comprising instructions operable to cause the apparatus to identify, when the apparatus does not receive the single transmission, the plurality of values from the technical specification.

16. The apparatus of claim 11, wherein at least one of the plurality of values is for all apparatuses in a cell.

17. The apparatus of claim 11, wherein at least one of:

a first value is for a first type of apparatus, or a second value is for a second type of apparatus, and wherein the apparatus is of the first type of apparatus or the second type of apparatus.

18. The apparatus of claim 11, wherein each of the plurality of values is for a particular type of apparatus that is the apparatus.

19. The apparatus of claim 11, further comprising instructions operable to cause the apparatus to select at least one of the plurality of values based on a channel quality measurement.

20. The apparatus of claim 11, further comprising instructions operable to cause the apparatus to determine that at least one particular repetition of at least one of the initial transmission of the PUSCH transmission or the retransmission of the PUSCH transmission overlaps in a same slot with a preconfigured resource or a scheduled downlink measurement.

21. The method of claim 1, further comprising receiving, in the single transmission before the start of the random access procedure, the plurality of values.

22. The apparatus of claim 11, wherein the instructions, when executed by the processor, are to further cause the apparatus to:
receive, in the single transmission before the start of the random access procedure, the plurality of values.

23. The apparatus of claim 13, wherein the initial transmission of the PUSCH transmission is determined by an uplink grant in the random access response message.

24. The method of claim 3, wherein the initial transmission of the PUSCH transmission is determined by an uplink grant in the random access response message.

25. The method of claim 5, wherein the plurality of values are identified from the technical specification without additional signaling from a network node.

26. The method of claim 21, wherein the plurality of values are received in system information.

27. The method of claim 26, wherein the system information comprises a first system information block (SIB1).

28. The apparatus of claim 15, wherein the plurality of values are identified from the technical specification without additional signaling from a network node.

29. The apparatus of claim 22, wherein the plurality of values are received in system information.

30. The apparatus of claim 29, wherein the system information comprises a first system information block (SIB1).

\* \* \* \* \*